United States Patent [19]

Whiting

[11] Patent Number: 4,729,339
[45] Date of Patent: Mar. 8, 1988

[54] PRESSURE DIFFERENTIAL INDICATOR WITH NON-MECHANICAL THERMAL LOCKOUT

[75] Inventor: James C. Whiting, High Point, N.C.
[73] Assignee: Facet Enterprises, Inc., Tulsa, Okla.
[21] Appl. No.: 854,305
[22] Filed: Apr. 21, 1986
[51] Int. Cl.$^4$ .............................................. G01L 19/12
[52] U.S. Cl. .................................... 116/268; 116/267; 116/DIG. 42
[58] Field of Search ................. 116/70, 101, 216, 267, 116/268, DIG. 25, DIG. 42, 268, 272; 210/90; 236/48 A; 200/81.9 M, 82 E, 83 J, 83 L; 335/208, 217, 218

[56] References Cited

U.S. PATENT DOCUMENTS

| | | | |
|---|---|---|---|
| 2,794,100 | 5/1957 | Baader et al. | 335/208 |
| 3,412,706 | 11/1968 | Topol et al. | 116/267 |
| 3,448,716 | 6/1969 | Smith | 116/70 |
| 3,499,415 | 3/1970 | Gutkowski | 116/267 |
| 3,568,625 | 3/1971 | Cilento | 116/70 |
| 3,595,200 | 7/1971 | Cilento | 116/70 |
| 3,785,332 | 1/1974 | Silverwater | 116/267 |
| 4,029,042 | 6/1977 | Juhasz | 116/272 |
| 4,092,586 | 5/1978 | Dinkler et al. | 324/28 RS |
| 4,266,517 | 5/1981 | Sakakibara et al. | 335/208 |
| 4,651,670 | 3/1987 | Silverwater | 116/268 |

*Primary Examiner*—Charles Frankfort
*Assistant Examiner*—W. Morris Worth
*Attorney, Agent, or Firm*—Remy J. VanOphem

[57] ABSTRACT

An excessive pressure differential indicating device for use with a filter in a liquid circulating system. The device has a reciprocable piston that reciprocates between a high pressure location, when the pressure differential is not excessive, and a low pressure location, when the pressure differential is excessive. The device has an indicator button with a magnetically conductive element, and the button is retained in a non-indicating position when the reciprocable piston is at the high pressure location by magnetic attraction between a permanent magnet carried by the reciprocable piston and the magnetically conductive element, a spring being provided to bias the indicator button to an indicating position when the reciprocable piston moves with the permanent magnet away from the indicator button to the low pressure location. A thermal ferrite ring, which is magnetic at low temperatures and substantially less magnetic at high temperatures, is provided to retain the indicator button in its non-indicating position at low temperatures, even if the reciprocable piston moves to the low pressure location, since the excessive pressure differential which causes such movement of the reciprocable piston can, at low temperature, be caused solely by the increased viscosity of the circulating liquid, as opposed to an excessively clogged condition of the filter.

37 Claims, 5 Drawing Figures

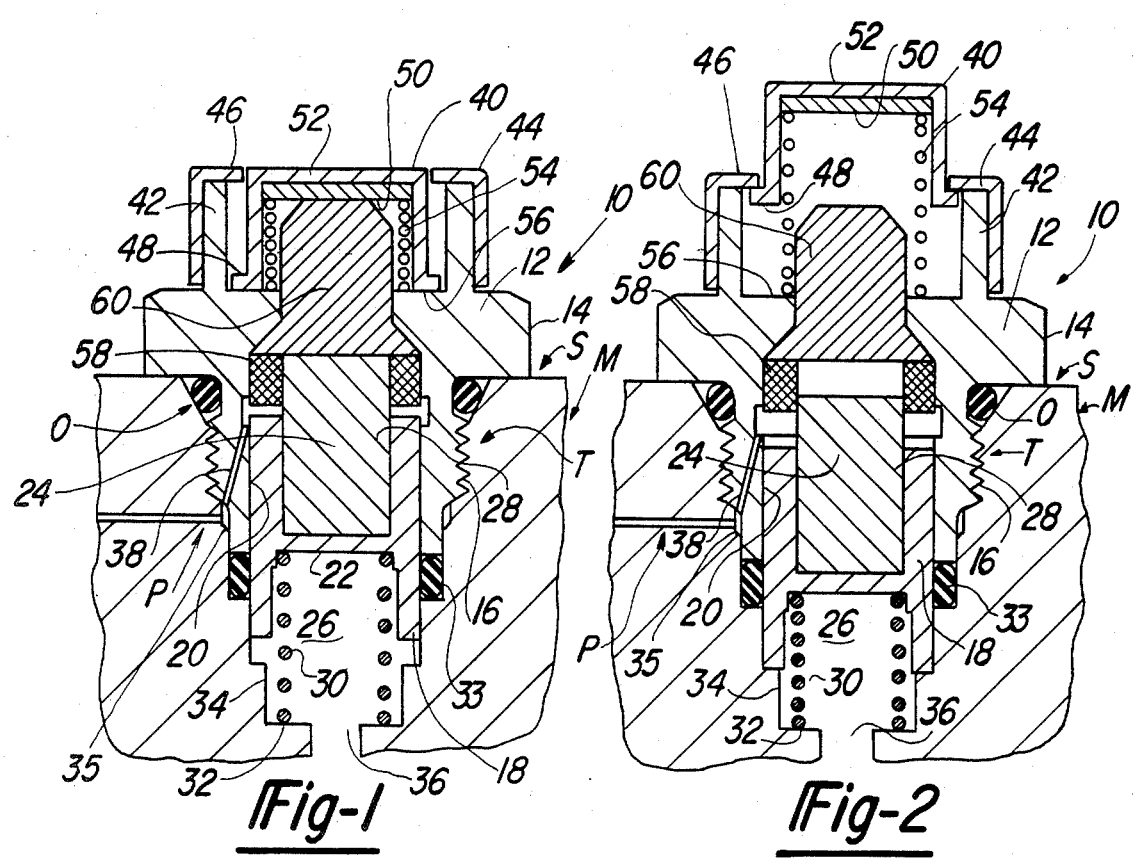
*Fig-1*
*Fig-2*
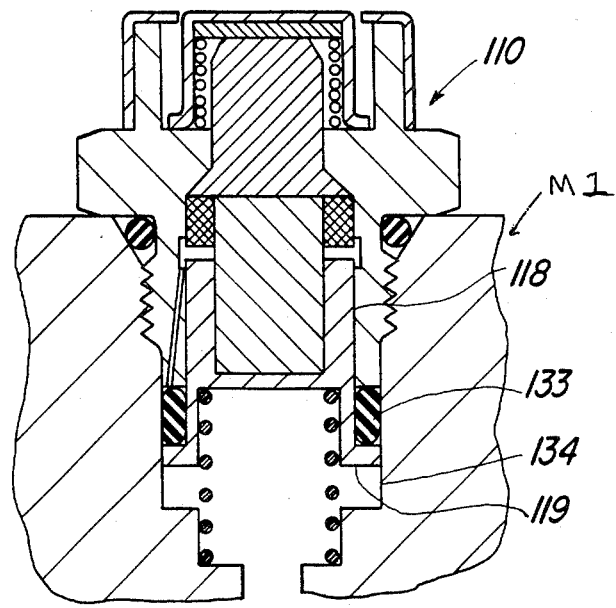
*Fig-3*

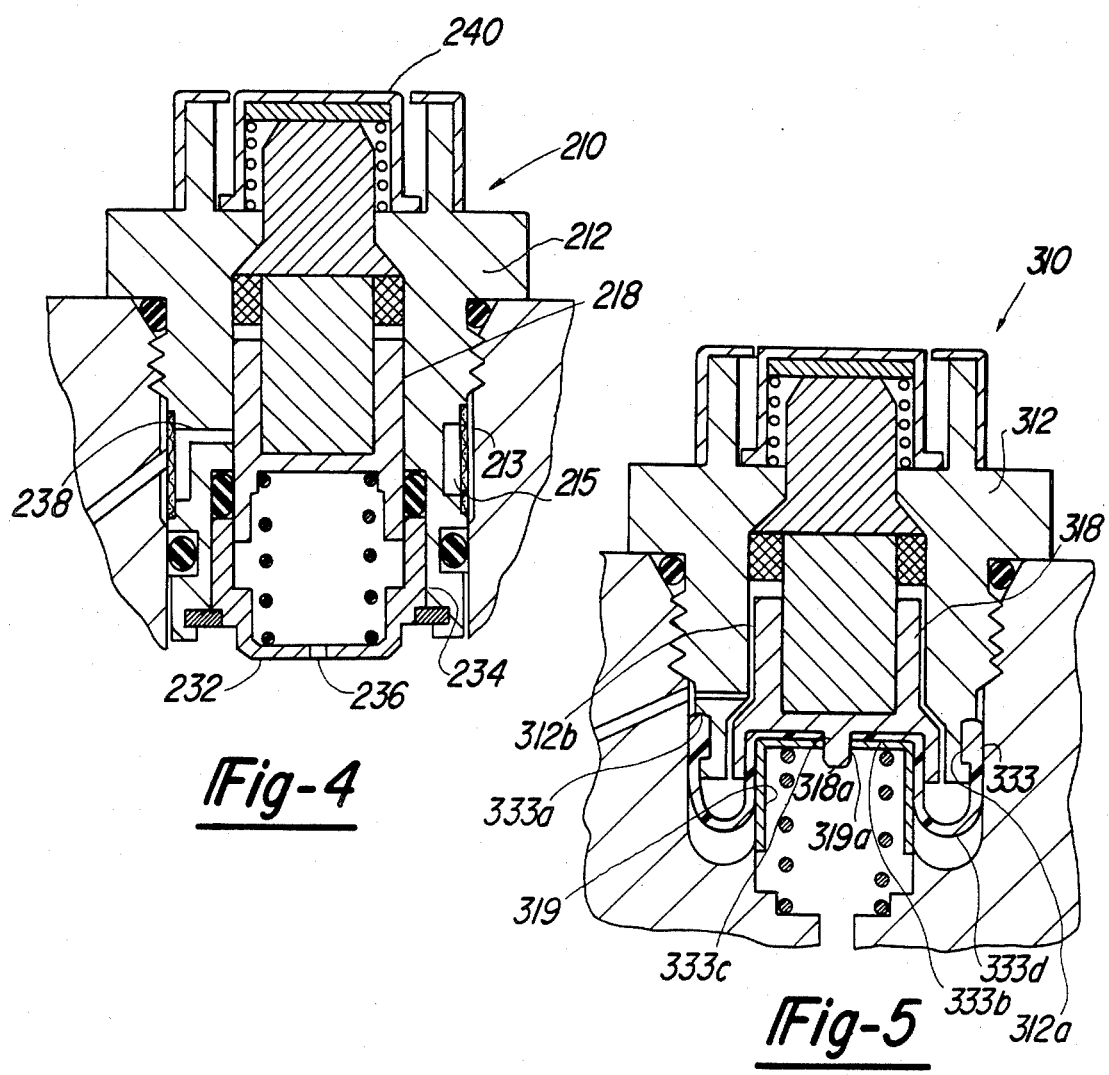

PRESSURE DIFFERENTIAL INDICATOR WITH NON-MECHANICAL THERMAL LOCKOUT

BACKGROUND OF THE INVENTION

1. Field of the Invention

This invention relates to a device to indicate an unacceptable pressure differential across the filter in a liquid circuit, such as a lubricating oil circuit or an hydraulic circuit. More particularly, this invention relates to a pressure differential indicator that has a nonmechanical temperature sensitive lockout feature to prevent the device from giving an excessive pressure differential condition indication when such condition exists by virtue of the viscosity of the circulating fluid at low temperatures, as opposed to a clogged condition of the filters.

2. Description of the Prior Art

It is known that it is useful to use a pressure differential indicating device in conjunction with a filter in a lubricating system or an hydraulic system to indicate a clogged condition of the filter, as evidenced by an excessive pressure differential across the filter, and it is known that it is useful to provide such a device with a temperature sensitive feature which will prevent the device from indicating a clogged condition when the pressure differential across the device is due to a low fluid temperature and the high fluid viscosity which results therefrom. For example, U.S. Pat. No. 3,117,550 (Cole) discloses a temperature sensitive pressure differential indicator in which the actuation of an indicator pin into a high pressure differential indicating position is effected by the springing of a temperature-compensating bimetallic convex disk; and U.S. Pat. No. 4,172,971 (Silverwater, et al) discloses a temperature sensitive pressure differential indicator which utilizes axially aligned magnetic elements in the actuation of the high pressure differential indicating button, with a thermostatic element to physically decouple the system at low operating temperatures to prevent a false indication of a high pressure differential at such low temperatures. Other prior patents which disclose the use of bimetallic temperature lockout elements in a liquid filter excessive pressure differential indicator are U.S. Pat. Nos. 3,812,816 (Juhasz); 3,386,410 (Barnes, Jr.); 3,402,690 (Willis); 3,140,690 (Siebel); and 2,942,572 (Pall).

Prior art devices of the type described above have certain problems associated with their use, however. One of the problems is that they rely on mechanical interference between parts that are movable relative to one another in response to a change in temperature to perform the thermal lockout feature, and the movement of such parts relative to one another, and the loads between them when they are in mechanically interferring position relative to one another lead to wear on such parts and can lead to eventual failure of one or another of such parts or loss of reliability in their operation. Additionally, the reliance on mechanical interference between parts that are movable relative to one another for the performance of a thermal lockout feature, as is characteristic of the above-described prior art devices, can lead to unreliable performance of such devices in an environment where they are subject to high frequency vibrations or shock loads of substantial magnitude.

SUMMARY OF THE INVENTION

According to the present invention there is provided a differential pressure indicator for indicating a clogged condition of a filter in a liquid circulating system, such as hydraulic fluid in an hydraulic system or oil in a lubrication system. The differential pressure indicator of this invention incorporates a temperature sensitive feature to lockout the operation of the differential pressure indicator during times when the temperature of the circulating liquid is below a predetermined value, when an excessive differential pressure condition can result from an increased viscosity of the circulating liquid, as opposed to a clogged condition in the filter that is being monitored by the differential pressure indicator.

The temperature sensitive lockout feature of the differential pressure indicator of the present invention results solely from the magnetic characteristics of the various elements of such indicator, one of such elements being an annular thermal ferrite element. This thermal ferrite element, reversibly, suffers a substantial change in its magnetic properties over a very narrow temperature range, known as the Curie point, being magnetic below the Curie point and substantially less magnetic above the Curie point. The annular thermal ferrite element cooperates with a permanent magnetic element, an armature and a magnetic iron pole piece, to retain a spring biased indicator button element of the indicator, which carries the armature, in its closed or non-indicating position at temperatures below the Curie point, by magnetic forces that act to retain the armature in the nonindicating position, notwithstanding a differential pressure condition that would otherwise permit the spring that acts on the indicator button to bias it to its released or indicating position. At temperatures of the thermal ferrite element above its Curie point, it suffers such a loss in its magnetic characteristics that it is unable to complete the magnetic circuit that acts on the armature carried by the indicator button, thus freeing the indicator button to release, under the force of the spring that acts against it, in response to an excessive differential pressure condition. Consequently, the thermal lockout feature of the differential pressure indicator of the present invention does not depend on a thermally sensitive mechanical interference condition between parts that are movable with respect to one another, and is thereby free from the problems of wear, failure and susceptibility to vibrations and shock loads that apply to differential pressure indicators which utilize such thermally sensitive mechanical lockout features.

Accordingly, it is an object of the present invention to provide an improved indicator for indicating an excessive differential pressure condition in a circulating liquid system.

More particularly, it is an object of the present invention to provide an indicator for indicating an excessive differential pressure condition in a circulating liquid system with an improved feature for locking out or suspending the operation of the indicator during periods of low liquid temperature.

Even more particularly, it is an object of the present invention to provide an indicator for indicating an excessive differential pressure condition in a circulating liquid system with a feature for locking out or suspending the operation of the indicator during periods of low liquid temperature that does not rely on mechanical interference between parts that are movable relative to one another in response to a change in temperature, to thereby avoid the wear and possible failure of such parts as a result of the operation thereof, and to improve the reliability of the operation of such indicator in an environment where it is subject to vibrations or shock loads.

It is also an object of the present invention to provide an indicator for indicating an excessive pressure differential condition in a circulating liquid system which can be manufactured in a relatively small size, with a relatively large indicating button.

For a further understanding of the present invention and the objects thereof, attention is directed to the drawing and the following description thereof, to the detailed description of the preferred embodiment, and to the appended claims.

BRIEF DESCRIPTION OF THE DRAWING

FIG. 1 is an elevational view, in section, of a preferred embodiment of a pressure differential indicator according to the present invention, showing the indicator in the position where it is not indicating an excessive pressure differential condition;

FIG. 2 is an elevational view, in section, of the pressure differential indicator of FIG. 1 showing the indicator in the position where it is indicating an excessive pressure differential condition;

FIG. 3 is an elevational view, in section, of an alternative embodiment of a pressure differential indicator according to the present invention, showing the indicator in the position where it is not indicating an excessive pressure differential condition;

FIG. 4 is an elevational view, in section, of another alternative embodiment of a pressure differential indicator according to the present invention, showing the indicator in the position where it is not indicating an excessive pressure differential condition; and FIG. 5, is an elevational view, in section, of yet another alternative embodiment of a pressure differential indicator according to the present invention, showing the indicator in the position where it is not indicating an excessive pressure differential condition.

DETAILED DESCRIPTION OF THE PREFERRED EMBODIMENT

The preferred embodiment of a pressure differential indicator according to the present invention is generally indicated by reference numeral 10 in FIGS. 1 and 2. The pressure differential indicator 10 is actually shown at an enlarged scale, it being possible and preferred, for reasons of cost and ease of installation, to keep such pressure differential indicator 10 relatively small, for example, less than one and one-half inches (1½ in.) in vertical height. The pressure differential indicator 10 includes an irregularly-shaped annular body portion 12 which has an annular flange 14 extending therefrom. The annular flange 14 is adapted to bear against a surface S of a member M to which the pressure differential indicator 10 is affixed, the annular body portion 12 of the pressure differential indicator 10 having an externally threaded portion 16 which is threaded into an internally threaded portion T of the member M to facilitate the affixing of the pressure differential indicator 10 to the member M. To help provide a liquid tight seal between the pressure differential indicator 10 and the member M, an O-ring seal 0 is trapped therebetween as is known in the art.

The pressure differential indicator 10 has an annular piston 18 which is reciprocable within a bore 20 in the annular body portion 12 between a first position, which is shown in FIG. 1, and a second position which is shown in FIG. 2, the first position being above the second position in the vertical orientation of the pressure differential indicator depicted in FIGS. 1 and 2.

The annular piston 18 has a web 22 extending thereacross at a location between the ends of the annular piston 18, and the web 22, thereby, forms an upper, upwardly facing pocket 24 and a lower, downwardly facing pocket 26 within the annular piston 18. The upper pocket 24 within the annular piston 18 has a permanent magnet 28 located therein, the permanent magnet 28 extending above the top of the annular piston 18 for reasons which will hereinafter be explained more fully, and the permanent magnet 28 is fixed within the upper pocket 24 of the annular piston 18 and reciprocates with the annular piston 18. The lower pocket 26 of the annular piston 18 traps the upper end of a compression spring 30, the compression spring 30 extending below the lower end of the annular piston 18 and being retained by an annular shoulder 32 that extends radially inwardly from a bore 34 in the member M 34 thus, the compression spring 30 serves to provide an upwardly directed biasing force on the annular piston 18, by virtue of the contact of the upper end of the compression spring 30 against the underside of the web 22 of the annular piston 18. A sliding seal 33 is positioned between the lower extremity of the annular body portion 12 and an annular shoulder in the housing M, to sealingly engage the annular piston 18 during sliding movement of the annular piston.

The pressure differential indicator 10 is installed, with respect to the circulating liquid system being monitored, so that the underside of the web 22 of the annular piston 18 is exposed to a low pressure location within the circulating liquid system, for example, to the outlet or downstream side of a filter (not shown) that is used in the circulating liquid system, through an opening 36 in the member M, the opening 36 being defined by the inner periphery of the annular shoulder 32. The upper annular edge of the annular piston 18 is exposed to a high pressure location within the circulating liquid system, for example, to the inlet or upstream side of the filter, through a passage 38 which extends through the annular body portion 12 of the pressure differential indicator 10 and which communicates with a passage P in the member M. Thus, there is a pressure differential force that acts against the annular piston 18 that is opposed to the force that is imposed on the annular piston 18 by the compression spring 30. The various elements of the pressure differential indicator 10 are so calibrated that the force imposed on the annular piston 18 by the compression spring 30 will exceed the pressure differential force when the pressure differential force is less than a predetermined acceptable maximum, for example, when the filter of the associated liquid circulating system is clean and free flowing, and when this condition prevails, the annular piston will be in its first, FIG. 1 position. Conversely, as the filter becomes clogged, the flow therethrough will become obstructed and the pressure differential across the filter will increase, and eventually the force on the annular piston 18 resulting from the pressure differential will overcome the force resulting from the compression spring 30, and the annular piston 18 will move to its second, FIG. 2 position, where its movement will be limited by an annular shoulder that extends radially outwardly from the bore 34.

The pressure differential indicator 10 also includes a cup-shaped indicator button 40 which is shown in a non-indicating position in FIG. 1 where it is shrouded by an annular extension portion 42 of the annular body portion 12 and an annular retainer 44 that is pressed or crimped on the exterior of the annular extension portion 42. The annular retainer 44 has an annular flange 46 that extends radially inwardly from the upper portion thereof, and the annular flange 46 is adapted to engage a radially outwardly extending annular flange 48 at the base of the indicator button 40 to limit the travel of the indicator button 40 within the annular retainer 44.

The indicator button 40 has a soft steel or iron disk 50 contained therein, illustrated as being positioned against the closed end 52 of the indicator button. The disk 50 serves as the armature in a magnetic circuit that includes the permanent magnet 28. A compression spring 54 has an upper end which acts on the underside of the disk 50 and a lower end which is retained by an upper shoulder 56 of the annular body portion 12, and the compression spring 54, therefore, acts to bias the indicator button from the lower, non-indicating position shown in FIG. 1 to the upper position shown in FIG. 2 where it serves as a visually detectable indication of an excessive pressure differential condition across the filter of the liquid circulating system being monitored by the pressure differential indicator 10. However, when the annular piston 18 is in its upper position as shown in FIG. 1, the position corresponding to an acceptable pressure differential condition across such filter, the indicator button 40 will be retained in its lower, non-indicating position, as shown in FIG. 1, by the magnetic force exerted by the permanent magnet 28 on the disk 50, the magnetic force from the permanent magnet 28 being transmitted to the disk 50 through a magnetically permeable iron pole piece 60. When the pressure differential across the filter being monitored exceeds the predetermined value and moves the annular piston to the second, FIG. 2 position, as heretofore explained, the permanent magnet 28 will be drawn away from the pole piece 60, thus reducing the magnetic forces transmitted through the pole piece 60 to the disk 50 and thereby allowing the compression spring 54 to move the indicator button 40 to its upper, indicating position.

The locking out of the release of the indicator button 40 from its lower, non-indicating position, shown in FIG. 1, to its upper, indicating position, shown in FIG. 2, during periods of low circulating liquid temperature when the annular piston 18 can be moved to its second, FIG. 2, position as a result of an increase in the viscosity of the circulating liquid as opposed to a clogged condition of the filter being monitored, is accomplished by providing an annular, thermal ferrite ring 58 that slidably surrounds the portion of the permanent magnet 28 that extends above the upper edge of the annular piston 18 and that is in contact with the underside of the pole piece 60. The thermal ferrite ring 58 is formed from one of a family of thermal ferrite materials, which are, basically, ceramic type metal oxides mainly including iron oxide, manganese oxide and zinc oxide. The specific thermal ferrite material for any given application for a pressure differential indicator is selected based on its Curie point, the temperature above which its saturated magnetic flux density is severly reduced, it being desired that the Curie point correspond to the temperature below which the activation of the indicator button 40 by the movement of the annular piston 18 to its second, FIG. 2 position is to be prevented or locked out. The thermal ferrite ring 58 has substantial magnetic properties below its Curie point, so that it will impose a magnetic retention force on the disk 50 within the indicator button 40, a force that is sufficient to overcome the opposing force imposed by the compression spring 54 notwithstanding the movement of the annular piston 18 from its first, FIG. 1 position to its second, FIG. 2 position by virtue of an increase in the pressure differential force on the annular piston 18. Of course, at temperatures above the Curie point of the thermal ferrite ring 58, it loses substantially all its magnetic properties, so that the indicator button 40 will then be free to move from its non-indicating, FIG. 1 position to its indicating, FIG. 2 position when an increase in the pressure differential across the annular piston 18 causes it to move from its first, FIG. 1 position to its second, FIG. 2 position. Thermal ferrite materials of the type referred to herein are available for purchase from Nippon Ferrite, Ltd. of Tokyo, Japan through their distributor in the United States, Hitachi Magnetic Corp., a corporation with an office in Nashua, N.H.

FIG. 3 illustrates an alternative embodiment of a pressure differential indicator according to the present invention, which is generally indicated by reference numeral 110. Except as is hereinafter described, the pressure differential indicator 110 of FIG. 3 is the same in construction and operation as the pressure differential indicator 10 of FIGS. 1 and 2.

The pressure differential indicator 110 of FIG. 3 is intended for use in somewhat lower pressure differential liquid circulating systems than the pressure differential indicator 10 of FIGS. 1 and 2, and to be more responsive to the low or downstream pressure in such a lower pressure differential system, the pressure differential indicator is provided with a reciprocable annular piston 118 whose low pressure end is enlarged by providing it with a radially extending annular flange 119 to increase the force imposed on the reciprocable annular piston 118 by virtue of the increased surface area that is exposed to low system pressure. The lower end of the reciprocable annular piston 118 reciprocates within an end piece 134 of the pressure differential indicator 110 somewhat in the manner of the reciprocation of the lower end of the annular piston 18 within the bore 34 of the member M of the pressure differential indicator 10, except that the sealing of the reciprocable annular piston 118 the pressure differential indicator 110 is accomplished by a sliding seal 133 which is attached to the reciprocable annular piston 118 and slides with respect to the bore 134 of the member M1, whereas the sliding seal 33 of the pressure differential indicator 10 is retained between a counterbore in the member M and the annular piston 18 which slides with respect to such sliding seal 33.

FIG. 4 illustrates another alternative embodiment of a pressure differential indicator according to the present invention, which is generally indicated by reference numeral 210. Except as is hereinafter described, the pressure differential indicator 210 of FIG. 4 is the same in construction and operation as the pressure differential indicator 10 of FIGS. 1 and 2.

The pressure differential indicator 210 of FIG. 4 is a self-contained indicator, unlike the pressure differential indicator 10 which relies partially on the member M to contain its various elements and the pressure differential indicator is intended for use in liquid circulating systems that experience pulses in the pressure levels within the system. Thus, the pressure differential indicator 210 is designed for applications where it is necessary or desirable to utilize a self-contained indicator, and it is designed to temporarily insulate the low pressure side of a reciprocable annular piston 218 from the effects of such pulses in the pressure levels, to prevent the release of an indicator button 240 of the pressure differential indicator 210 solely as a result of a pulse in the pressure level, as opposed to an objectionably high stable pressure differential when it is desired to permit the release of the indicator button 240. To temporarily insulate the low pressure side of the annular piston 218 from the effects of pulses in the pressure levels of the circulating fluid, the pressure differential indicator 210 is provided with an annular body portion 212 which is substantially longer than the annular body portion 12 of the pressure differential indicator 10 and which substantially encircles an end piece 234 of the pressure differential indicator 210. The end piece has a substantially closed end 232, with an orifice 236 therein is exposed to the low pressure side of the circulating liquid in the liquid circulating system. The annular body portion 212 of the pressure differential indicator 210 is provided with an annular filter 213 surrounding an annular recess 215 within the annular body portion to protect the high pressure side of the annular piston 218 from fouling or wear by virtue of any contaminants that may be present in the circulating fluid, which is in communication with the high pressure side of the annular piston 218 from the annular recess 215 through an orifice 238. The orifice 238 in the annular recess 215 is very small thus, insulating the high pressure side of the annular piston 218 from short duration pulses in the high pressure side of the circulating fluid. The differential pressure indicator 10 of the embodiment of FIGS. 1 and 2 and the differential pressure indicator 110 of the embodiment of FIG. 3 may also be provided with a high pressure side filter, similar to the filter 213 of the differential pressure indicator 210, where desired.

FIG. 5 illustrates yet another alternative embodiment of a pressure differential indicator according to the present invention, which is indicated generally by reference numeral 310. Except as is hereinafter described the pressure differential indicator 310 of FIG. 5 is the same in construction and operation as the pressure differential indicator 10 of FIGS. 1 and 2.

The pressure differential indicator 310 is intended for use in very low pressure differential liquid circulating systems where the frictional forces resulting from the use of a sliding seal such as the sliding seal 33 of the pressure differential indicator 10 would or could be high in relation to the pressure differential forces acting on a reciprocable piston, such as the annular piston 18 of the pressure differential indicator 10. In the pressure differential indicator 310 the frictional forces resulting from a seal to seal the reciprocable annular piston 318 are very substantially reduced, relative to those which would result from the use of a sliding seal, such as the sliding seal 33 of the pressure differential indicator 10, by the use of a flexible rolling diaphragm 333 as the sealing element. The rolling diaphragm has an enlarged end 333a which is contained in an annular groove 312a of an annular body portion 312, and, further, the rolling diaphragm 333 has a second end 333b that is affixed to the low pressure end of the reciprocable annular piston 318, the rolling diaphragm 333 having a centering hole 333c that fits over a centering projection 318a that extends from the low pressure end of the reciprocable annular piston 318. The second end 333b of the rolling diaphragm 333 is retained in position with respect to the centering projection 318a of the reciprocable annular piston 318 by an inverted cup shaped member 319 that is provided with a centering hole 319a that fits over the centering projection 318a of the reciprocable annular piston 318. The rolling diaphragm 333 also has an intermediate portion 333d between the enlarged end 333a and the second end 333b, and the intermediate portion 333d has sufficient length, being draped in the form of a U, to accommodate all permissible travel of the annular piston 318. The interior of the intermediate portion 333d of the rolling diaphragm 333 is pressurized by fluid from the high pressure side of the reciprocable annular piston 318 by providing an annular clearance passage 312b between the exterior of the reciprocable annular piston 318 and the interior of the annular body portion 312 to reduce the sliding friction between the reciprocable annular piston 318 and the annular body portion 312 and prevent the development of partial vacuum within the intermediate portion 333d of the rolling diaphragm 333.

Thus, having described the present invention by way of an exemplary embodiment, it will be apparent to those skilled in the art that many modifications may be made from the exemplary embodiment without departing from the spirit of the present invention or the scope of the claims appended thereto.

What is claimed is:

1. An indicator for use in a fluid system for indicating an excessive differential in pressure of a fluid in said system between a high pressure location in said fluid system and a low pressure location in said fluid system, said indicator comprising:

a reciprocable piston having a first end exposed to said fluid at said high pressure location in said fluid system and a second end exposed to said fluid at said low pressure location in said fluid system;

a spring resiliently biasing said piston toward said high pressure location in said fluid system, said spring resiliently biasing said piston will maintain said piston at said high pressure location when a difference in pressure between said high pressure location in said fluid system and said low pressure location in said fluid system is below a predetermined pressure differential, said spring resiliently biasing said piston further will not maintain said piston at said high pressure location in said fluid system when said difference in pressure exceeds said predetermined pressure differential, whereby said piston will move toward said low pressure location in said fluid system when said difference in pressure exceeds said predetermined pressure differential;

permanent magnet means carried by said reciprocable piston;

a magnetically permeable pole piece means having a first end positioned adjacent said permanent magnet means when said reciprocable piston is at said high pressure location in said fluid system said pole piece means having a second end opposite said first end indicator button means having a magnetically permeable element carried thereby, said indicator button means being reciprocable between a first position at which said magnetically permeable element is adjacent said second end of said magnetically permeable pole piece and a second position in which said magnetically permeable element is spaced apart from said second end of said magnetically permeable pole piece, said permanent magnet means imposing a magnetic force transmitted at least in part by said magnetically permeable pole piece on said magnetically permeable element that attracts said indicator button means toward said first position;

a second spring resiliently biasing said indicator button means toward said second position, said second spring biasing said indicator button means thereby imposing a biasing force which is less than said magnetic force when said reciprocable piston is at said high pressure location and being greater than said magnetic force when said reciprocable piston is at said low pressure location, whereby said second spring will move said indicator button means from said first position to said second position when said reciprocable piston moves from said high pressure location in said fluid system to said low pressure location in said fluid system; and an annular thermal ferrite element that is magnetic at temperatures below a narrow, predetermined temperature range and that is substantially less magnetic at temperatures above said narrow predetermined temperature range, said annular thermal ferrite element being located adjacent said first end of said magnetically permeable pole piece, said thermal ferrite element being positioned to surround said permanent magnet means when said reciprocable piston is at said high pressure location in said fluid system in order to impose a magnetic force on said indicator button means when said thermal ferrite element is at a temperature below said narrow, predetermined temperature range, such that said magnetic force causes said indicator button means to remain at said first position when said reciprocable piston moves to said low pressure location in said fluid system, and further, such that said magnetic force imposed by said thermal ferrite element on said indicator button means reduces when said thermal ferrite element is at a temperature above said narrow, predetermined temperature range thereby permitting said biasing force of said second spring to move said indicator button means from said first position to said second position as said reciprocable piston moves to said low pressure location in said fluid system.

2. An indicator according to claim 1 and further comprising annular body means, said reciprocable piston being reciprocable within said annular body means.

3. An indicator according to claim 2 and further comprising seal means for sealing the reciprocable piston in relation to said annular body means.

4. An indicator according to claim 3 wherein said seal means comprises a sliding seal, said sliding seal being fixed relative to said magnetic iron pole piece means in said space to help transmit magnetic force from said permanent magnet means to said magnetically conductive element carried by said indicator button means.

5. An indicator according to claim 3, wherein said seal means comprises a sliding seal, said sliding seal being fixed relative to said reciprocable piston and reciprocable with said reciprocable piston relative to said annular body means.

6. An indicator according to claim 3 wherein said seal means comprises a flexible rolling draphragm having a first end sealingly attached to said annular body means, a second end sealingly attached to said reciprocable piston and a draped intermediate portion of sufficient length to permit said reciprocable piston to reciprocate between said high pressure location and said low pressure location.

7. An indicator according to claim 1 and further comprising annular body means, said reciprocable piston being reciprocable within said annular body means.

8. An indicator according to claim 7 and further comprising seal means for sealing fluid of said fluid system during reciprocation of said reciprocable piston within said annular body means.

9. An indicator according to claim 8, wherein said seal means comprises a sliding seal, said sliding seal being fixed relative to said reciprocable piston and reciprocable with the reciprocation of said reciprocable piston relative to said annular body means.

10. An indicator for indicating a predetermined value of fluid pressure differential of a fluid in a fluid system, comprising:

body means for locating said indicator in said fluid system;

a reciprocable piston sealingly mounted in said body means, said reciprocable piston being exposed to said fluid pressure differential in said fluid system, said piston being thereby fluidically biased in a first direction;

first biasing means located in said body means for biasing said reciprocable piston in a direction opposite said first direction;

an indicator button reciprocably, mounted to said body means, said button having attached thereto a first magnetic material element;

second biasing means located in said body means for biasing said indicator button in a direction opposite said first direction;

a second magnetic material element attached to said reciprocable piston, said first magnetic material element being magnetically attractive with said second magnetic material element, said reciprocable piston being thereby magnetically biased in a direction opposite said first direction and said indicator button being thereby magnetically biased in said first direction; and a thermal ferrite element having a predetermined Curie temperature attached to said body means, said thermal ferrite element increasing said magnetic attraction when said thermal ferrite element is substantially at a temperature below said Curie temperature, said indicator button being magnetically biased by said first and second magnetic materials in said first direction when said fluid pressure differential is less than said predetermined value, said indicator button being magnetically biased by said thermal ferrite element in said first direction when said fluid pressure differential exceeds said predetermined value and said thermal ferrite element is substantially at a temperature below said predetermined Curie temperature, said indicator button being moved by said second biasing means in a direction opposite said first direction when said fluid pressure differential exceeds said predetermined value and said thermal ferrite element is substantially at a temperature above said predetermined Curie temperature.

11. An indicator according to claim 10 wherein said Curie temperature of said thermal ferrite element corresponds to a temperature of said fluid in said fluid system above which viscosity of said fluid is not a substantial cause of said predetermined pressure differential.

12. An indicator according to claim 11 wherein said reciprocable piston is sealingly mounted by a seal means, said seal means comprising a sliding seal, said sliding seal being fixed relative to said body means, said reciprocable piston being sealingly reciprocable with respect to said sliding seal.

13. An indicator for use in a fluid system for indicating an excessive differential in pressure of a fluid in said fluid system between a high pressure location in said fluid system and a low pressure location in said fluid system, said indicator comprising:

a reciprocable piston having a first end exposed to said fluid at said high pressure location in said fluid system and a second end exposed to said fluid at said low pressure location in said fluid system;

a spring resiliently biasing said piston toward said high pressure location in said fluid system, said spring biasing said piston will maintain said piston at said high pressure location in said fluid system when the difference in pressure between said high pressure location in said fluid system and said low pressure location in said fluid system is below a predetermined pressure differential, said spring biasing said piston further will not maintain said piston at said high pressure location in said fluid system when said difference in pressure exceeds said predetermined pressure differential, whereby said piston will move toward said low pressure location in said fluid system when said difference in pressure exceeds said predermined pressure differential;

permanent magnet means carried by said reciprocable piston;

indicator button means having a magnetically permeable element carried thereby, said indicator button means being reciprocable between a first position in which said magnetically permeable element is adjacent said permanent magnet means and a second position in which said magnetically permeable element is spaced apart from said permanent magnet means, said permanent magnet means imposing a first magnetic force on said magnetically permeable element that attracts said indicator button means toward said first position;

a second spring resiliently biasing said indicator button means toward said second position, said second spring biasing on said indicator button means imposing a biasing force which is less than said magnetic force when said reciprocable piston is at said high pressure location in said fluid system and being greater than said first magnetic force when said reciprocable piston is at said low pressure location in said fluid system, whereby said second spring will move said indicator button means from said first position to said second position when said reciprocable piston moves from said high pressure location in said fluid system to said low pressure location in said fluid system; and a thermal ferrite element that is magnetic at temperatures below a narrow, predetermined temperature range and that is substantially less magnetic at temperatures above said narrow predetermined temperature range, said thermal ferrite element being positioned relative to said permanent magnet means so as to impose a second magnetic force on said indicator button means when said thermal ferrite element is at a temperature below said narrow, predetermined temperature range, said second magnetic force causing said indicator button means to remain at said first position even when said reciprocable piston moves to said low pressure location in said fluid system, said second magnetic force imposed by said thermal ferrite element on said indicator button means when said thermal ferrite element is at a temperature above said narrow, predetermined temperature range thereby permitting said second spring to move said indicator button means from said first position to said second position when said reciprocable piston moves to said low pressure location in said fluid system.

14. An indicator according to claim 13 wherein a space exists between said permanent magnet means and said magnetically permeable element when said reciprocable piston is at said low pressure location said indicator button means is at said first position and further comprising:

magnetic iron pole piece means in said space to help transmit magnetic force from said permanent magnet means to said magnetically conductive element carried by said indicator button means.

15. An indicator according to claim 14 wherein said magnetic iron pole piece means has a first end that is adjacent said magnetically permeable element carried by said indicator button means when said indicator button means is at said first position and a second end that is adjacent said permanent magnet means when said reciprocable piston is at said high pressure location.

16. An indicator according to claim 15 wherein said thermal ferrite element is adjacent said second end of said magnetic iron pole piece means.

17. An indicator according to claim 16 wherein said thermal ferrite element is annular in configuration and surrounds said permanent magnet means when said reciprocable piston is at said high pressure location.

18. An indicator according to claim 14 and further comprising annular body means, said reciprocable piston being reciprocable within said annular body means.

19. An indicator according to claim 15 and further comprising annular body means, said reciprocable piston being reciprocable within said annular body means.

20. An indicator according to claim 16 and further comprising annular body means, said reciprocable piston being reciprocable within said annular body means.

21. An indicator according to claim 17 and further comprising annular body means, said reciprocable piston being reciprocable within said annular body means.

22. An indicator according to claim 18 and further comprising seal means for sealing the reciprocable piston in relation to said annular body means.

23. An indicator according to claim 19 and further comprising seal means for sealing the reciprocable piston in relation to said annular body means.

24. An indicator according to claim 20 and further comprising seal means for sealing the reciprocable piston in relation to said annular body means.

25. An indicator according to claim 21 and further comprising seal means for sealing the reciprocable piston in relation to said annular body means.

26. An indicator according to claim 22 wherein said seal means comprises a sliding seal, said sliding seal being fixed relative to said annular body means, said reciprocable piston being sealingly reciprocable with respect to said sliding seal.

27. An indicator according to claim 23 wherein said seal means comprises a sliding seal, said sliding seal being fixed relative to said annular body means, said reciprocable piston being sealingly reciprocable with respect to said sliding seal.

28. An indicator according to claim 24 wherein said seal means comprises a sliding seal, said sliding seal being fixed relative to said annular body means, said reciprocable piston being sealingly reciprocable with respect to said sliding seal.

29. An indicator according to claim 25 wherein said seal means comprises a sliding seal, said sliding seal being fixed relative to said annular body means, said reciprocable piston being sealingly reciprocable with respect to said sliding seal.

30. An indicator according to claim 22 wherein said seal means comprises a sliding seal, said sliding seal being fixed relative to said reciprocable piston and reciprocable with said reciprocable piston relative to said annular body means.

31. An indicator according to claim 23 wherein said seal means comprises a sliding seal, said sliding seal being fixed relative to said reciprocable piston and reciprocable with said reciprocable piston relative to said annular body means.

32. An indicator according to claim 24 wherein said seal means comprises a sliding seal, said sliding seal being fixed relative to said reciprocable piston and reciprocable with said reciprocable piston relative to said annular body means.

33. An indicator according to claim 25 wherein said seal means comprises a sliding seal, said sliding seal being fixed relative to said reciprocable piston and reciprocable with said reciprocable piston relative to said annular body means.

34. An indicator according to claim 22 wherein said seal means comprises a flexible rolling draphragm having a first end sealingly attached to said annular body means, a second end sealingly attached to said reciprocable piston and a draped intermediate portion of sufficient length to permit said reciprocable piston to reciprocate between said high pressure location and said low pressure location.

35. An indicator according to claim 23 wherein said seal means comprises a flexible rolling draphragm having a first end sealingly attached to said annular body means, a second end sealingly attached to said reciprocable piston and a draped intermediate portion of sufficient length to permit said reciprocable piston to reciprocate between said high pressure location and said low pressure location.

36. An indicator according to claim 24 wherein said seal means comprises a flexible rolling draphragm having a first end sealingly attached to said annular body means, a second end sealingly attached to said reciprocable piston and a draped intermediate portion of sufficient length to permit said reciprocable piston to reciprocate between said high pressure location and said low pressure location.

37. An indicator according to claim 25 wherein said seal means comprises a flexible rolling draphragm having a first end sealingly attached to said annular body means, a second end sealingly attached to said reciprocable piston and a draped intermediate portion of sufficient length to permit said reciprocable piston to reciprocate between said high pressure location and said low pressure location.

* * * * *

UNITED STATES PATENT AND TRADEMARK OFFICE
CERTIFICATE OF CORRECTION

PATENT NO. : 4,729,339

DATED : March 8, 1988

INVENTOR(S) : James C. Whiting

It is certified that error appears in the above-identified patent and that said Letters Patent is hereby corrected as shown below:

Column 1, line 12, delete "nonmechanical" and insert ---- non-mechanical ----.

Column 1, line 57, delete "ring" and insert ---- ing ----.

Column 1, line 60, before "loss" insert ---- a ----.

Column 2, line 32, delete "nonindicating" and insert ---- non-indicating ----.

Column 3, line 36, delete "5," and insert ---- 5 ----.

Column 4, line 21, delete "M 34" and insert ---- M ----.

Column 5, line 62, delete "severly" and insert ---- severely ----.

Column 6, line 38, before "low" insert ---- a ----.

Column 7, line 1, delete "a".

Column 7, line 2, delete "reciprocable" and insert ---- an ----.

UNITED STATES PATENT AND TRADEMARK OFFICE
CERTIFICATE OF CORRECTION

PATENT NO. : 4,729,339

DATED : March 8, 1988

INVENTOR(S) : James c. Whiting

Page 2 of 4

It is certified that error appears in the above-identified patent and that said Letters Patent is hereby corrected as shown below:

Column 7, line 17, delete "is".

Column 7, line 28, after "small" insert a comma ---- , ----.

In the Claims

Column 8, line 64, after "piece" insert ---- means ----.

Column 8, line 67, after "piece" insert ---- means ----.

Column 9, line 2, after "piece" insert ---- means ----.

Column 9, line 24, after "piece" insert ---- means ----.

Column 9, line 53, after "said" insert ---- annular body means, said reciprocable piston being sealingly reciprocable with respect to said sliding seal.----.

Column 9, kindly delete lines 54 through 57 in their entirety.

Column 9, line 64, delete "draphragm" and insert ---- diaphragm ----.

Column 10, line 23, before "piston" insert ---- reciprocable ----.

UNITED STATES PATENT AND TRADEMARK OFFICE
CERTIFICATE OF CORRECTION

PATENT NO. : 4,729,339

DATED : March 8, 1988

INVENTOR(S) : James C. Whiting

It is certified that error appears in the above-identified patent and that said Letters Patent is hereby corrected as shown below:

Column 10, line 28, delete "reciprocable," and insert ---- reciprocable ----.

Column 10, line 29, before "button" insert ---- indicator ----.

Column 11, line 16, before "piston" insert ---- reciprocable ----.

Column 11, line 24, after "said" insert ---- reciprocable ----, both occurrences.

Column 11, line 28, before "piston" insert ---- reciprocable ----.

Column 12, line 17, after "location" insert ---- and ----.

Column 14, line 2, delete "draphragm" and insert ---- diaphragm ----.

Column 14, line 10, delete "draphragm" and insert ---- diaphragm ----.

Column 14, line 18, delete "draphragm" and insert ---- diaphragm ----.

Column 14, line 26, delete "draphragm" and insert ---- diaphragm ----.

UNITED STATES PATENT AND TRADEMARK OFFICE
CERTIFICATE OF CORRECTION

PATENT NO. : 4,729,339

DATED : March 8, 1988

INVENTOR(S) : James C. Whiting

Page 4 of 4

It is certified that error appears in the above-identified patent and that said Letters Patent is hereby corrected as shown below:

In the Abstract

Line 25, delete "opposied" and insert ---- opposed ----.

Signed and Sealed this

Twenty-second Day of November, 1988

Attest:

DONALD J. QUIGG

*Attesting Officer*   *Commissioner of Patents and Trademarks*